United States Patent [19]

Jax et al.

[11] Patent Number: 5,570,974
[45] Date of Patent: Nov. 5, 1996

[54] ASSEMBLY FOR MONITORING A LANDFILL AND A METHOD OF LOCATING LEAKS

[75] Inventors: Peter Jax, Erlangen; Klaus Ruthrof, Nuremberg, both of Germany

[73] Assignee: Siemens Aktiengesellschaft, Munich, Germany

[21] Appl. No.: 328,071

[22] Filed: Oct. 24, 1994

Related U.S. Application Data

[63] Continuation of PCT/DE93/00345 Apr. 21, 1993.

[30] Foreign Application Priority Data

Apr. 24, 1992 [DE] Germany ............................. 42 13 585.0

[51] Int. Cl.⁶ ..................... B09B 3/00; A62D 3/00
[52] U.S. Cl. ..................... 405/129; 405/128; 588/259; 588/260
[58] Field of Search ................... 405/129, 267, 405/128, 270; 588/259, 260

[56] References Cited

U.S. PATENT DOCUMENTS

| | | | |
|---|---|---|---|
| 3,586,624 | 6/1971 | Larson | 405/129 X |
| 3,977,233 | 8/1976 | Issel . | |
| 4,335,978 | 6/1982 | Mutch | 405/129 X |
| 4,430,021 | 2/1984 | Wagner et al. | 405/129 X |
| 4,526,615 | 7/1985 | Johnson | 405/129 X |
| 4,846,604 | 7/1989 | Holtmann | 405/129 X |
| 4,900,195 | 2/1990 | Schlutter et al. | 405/267 |
| 5,076,728 | 12/1991 | Golding . | |
| 5,127,771 | 7/1992 | Wind | 405/267 |
| 5,261,764 | 11/1993 | Walles | 405/53 X |

FOREIGN PATENT DOCUMENTS

| | | |
|---|---|---|
| 0130773 | 1/1985 | European Pat. Off. . |
| 0251026 | 1/1988 | European Pat. Off. . |
| 0262290 | 4/1988 | European Pat. Off. . |
| 3400799 | 7/1985 | Germany . |
| 3415883 | 10/1985 | Germany . |
| 3417332 | 11/1985 | Germany . |
| 3505687 | 6/1987 | Germany . |
| 3604600 | 8/1987 | Germany . |
| 3539193 | 9/1987 | Germany . |
| 3616377 | 11/1987 | Germany . |
| 3712881 | 6/1988 | Germany . |
| 3706869 | 5/1989 | Germany . |
| 3430965 | 11/1989 | Germany . |
| 9107693 | 10/1991 | Germany . |
| 9108428 | 10/1991 | Germany . |
| 9108467 | 10/1991 | Germany . |
| 4015190 | 11/1991 | Germany . |
| 4021893 | 1/1992 | Germany . |
| 4109520 | 9/1992 | Germany . |

OTHER PUBLICATIONS

Siemens prospectus "Long–Term Monitoring of Landfills with LEOS".

*Primary Examiner*—Dennis L. Taylor
*Attorney, Agent, or Firm*—Herbert L. Lerner; Laurence A. Greenberg

[57] ABSTRACT

The monitoring assembly for a landfill or garbage dump comprises two sensor hoses, which are laid on both sides of a sealing liner parallel to each other. A transport medium can flow through the sensor hoses in the same or in opposite directions. First and second indicator signals are determined with the aid of at least one detector. The indicator signals indicate the presence of a pollutant in the transport medium and thus in the relevant sensor hose. These signals are logically combined with each other, with regard to location, preferably subtracted from each other. The resulting signal distinctly shows an extreme value in its curve as soon as a leak is present in the sealing liner. The position can be easily determined from that graphic representation.

19 Claims, 8 Drawing Sheets

ASSEMBLY FOR MONITORING A LANDFILL AND A METHOD OF LOCATING LEAKS

CROSS-REFERENCE TO RELATED APPLICATION

This is a continuation of international application serial No. PCT/DE93/00345, filed Apr. 21, 1993.

BACKGROUND OF THE INVENTION

1. Field of the Invention

The invention relates to a monitoring device for a landfill or garbage dump in which a sealing liner is used. It also relates to a particularly favorable configuration of the sealing liner and to a process for localizing a leak in a sealing liner for a landfill. The invention does not only find application generally in the sealing and monitoring of waste dumps, but also in particular in the location of leaks in sites where hazardous industrial waste is deposited.

The Siemens prospectus "Long-term Dump Monitoring with LEOS", Order No. A 19100-U653-A222, July, 1991, discloses a device for sealing off a landfill and for detecting and locating leaks. In that case the landfill is provided with a water-tight liner, sealing web or "seal" (preferably made of synthetic material). The seal can be disposed underneath the body of the waste (base sealing), so that no pollutants can reach the groundwater. The seal can, however, also be laid above the body of the waste (surface sealing), in order to prevent ingress of rainwater and thus the washing out of pollutants from the waste. In order to detect a leak, i.e. a damaged location, in this seal early, in the case of the known device, provision is made for the laying of sensor hoses, that is to say of so-called LEOS hoses, specifically only on that side of the seal facing away from the body of the waste. In this case, LEOS stands for "leak location system".

The LEOS hoses, which are laid in a meandering or serpentine fashion, are filled with air and whose walls are permeable to various materials present in the dump, are connected to a central monitoring system. In the case of a placement of the seal underneath the body of the waste, a damage location therein is localized by detection of materials dissolved in the seepage water. And, in the case of a placement of the seal above the body of the waste, a damage location therein is localized by detecting rising foul gases.

An LEOS hose and a device used for its operation are disclosed in German patent DE-C 24 31 907. In this case a hose is utilized which is permeable to pollutants. At one end of the hose, a pump is disposed by which individual volumes of a transport medium, for example individual gas volumes, are successively fed at intervals in time through the hose. In this case, the hose is flowed through in each case for some time at uniform time intervals, i.e. at a constant frequency. At the other end of the hose there are sensors or detectors sensitive to the materials to be detected, particularly pollutants. In the event that a pollutant reaches the vicinity of the hose, this pollutant penetrates into the hose; it is taken to the sensors by means of the next pumping process of the transport medium. Since the medium in this case flows at a known speed, the location at which the pollutant has entered into the hose between two through-flow processes can be determined exactly from the difference between the switch-on instant of the pump and the response instant of the sensors. In addition, the quantity of pollutant can be determined.

German Utility Model G 91 07 693.5 and U.S. Pat. No. 5,215,409 describe a device for sealing and monitoring a body, preferably a waste dump, by means of a monitoring space. That disclosure is based on the knowledge that it is sensible to provide increased protection by means of a double barrier. This is expedient both in sealing the base and sealing the surface of a dump. Furthermore, the element is based on the consideration that it is also sensible to construct the system in such a way that it can be determined by measurement whether one or the other barrier has a leak and where the leak is. For this purpose, the element comprises two seals or sealing liners, which are spaced from each other by means of support elements. In so doing, at least one channel is formed between the seals and the supporting elements, which has an entry opening and an exit opening for a transport medium, such as for example air. This channel, in this case, is designed as a permeable LEOS hose, or it contains such a LEOS hose. At least one sensor, for example a sensor for liquid vapor and a sensor for gas, can be connected to the outlet opening. The two seals are connected to each other in a sealing manner at their edges, leaving free the inlet and outlet openings of the channel, so that the monitoring space is formed. The supporting elements comprise a material which is flow-permeable but flow-restricting (largely homogeneous). The hose can be surrounded by a filling material which holds back moisture, i.e. a drying medium.

Therefore, in the case of the last-named monitoring device, a monitoring space is an essential component, in which monitoring channels (permeable to the pollutant to be detected) or sensor hoses are incorporated, whose content is washed at regular time intervals in the direction of the detector. The monitoring space comprises walls closed on all sides, which are formed preferably from polyethylene webs or polyethylene liners. The space is vacuum-tight.

It now transpires that such a monitoring space in synthetic material technology can also be used on steep or even vertical wall regions of a landfill only at great cost. As an example, there are such vertical wall regions in special industrial landfills which are constructed using concrete troughs. As a result of thermal stresses of the concrete during hardening, under certain circumstances there are shrinkage cracks in the concrete, which can lead, in turn, to breaks in the adjacent polyethylene web and thus to a collapse of the double seal. Furthermore, it has transpired that the preparation of double-seal webs can be very expensive. A solution would thus be desireable which manages at a comparably lower cost.

SUMMARY OF THE INVENTION

It is accordingly an object of the invention to provide an assembly for monitoring a landfill or similar body of waste material and a method of locating leaks, which overcomes the hereinafore-mentioned disadvantages of the heretofore-known devices of this general type and which, based on the use of a sensor hose and a sealing liner, manages at a lower cost than in the prior art. A further object is to provide a process which can be carried out relatively simply and at low cost.

With the foregoing and other objects in view there is disclosed, in accordance with the invention, a monitoring assembly for a landfill, comprising:

a sealing liner having a first side and a second side;

a first sensor hose laid on the first side of the sealing liner;

a second sensor hose laid on the second side of the sealing liner, at least a portion of the second sensor hose running parallel to a portion of the first sensor hose;

pump means for charging the first and second sensor hoses with a transport medium;

detector means for issuing a first indicator signal indicating a substance in the transport medium fed through the first sensor hose and for issuing a second indicator signal indicating a substance in the transport medium fed through the second sensor hose; and logic means for logically linking, with respect to location, the first indicator signal from the first sensor hose with the second signal from the second sensor hose.

In summary, the invention functions without a closed-off monitoring space and with only a single, i.e. a single-layer, sealing liner.

The monitoring assembly provided here for achieving the given objects is equipped, according to the invention, with a sealing liner, with a first sensor hose which is laid on one side of the sealing liner, with a second sensor hose which is laid on the other side of the sealing liner, at least one section of the second sensor hose running parallel to a section of the first sensor hose, with at least one pump for pressurizing the first and second sensor hose with a transport medium, with at least one detector for transmitting a first and second indicator signal to indicate a material in the transport medium which is fed through the first and second sensor hose, and with means for the logical combination, according to location, of the indicator signal from the first sensor hose with the indicator signal from the second sensor hose.

The first and the second sensor hose can, in this case, in principle be flowed through by the washing transport medium in the same direction or in the opposite direction. In this case, either one common operating and indicating system can be provided for the two sensor hoses; or separate operating and indicating systems can be provided in each case. In the first case, the monitoring device is then particularly characterized by the fact that a connection is provided between the output of the first sensor hose and the input of the second sensor hose, and in that, for transmitting the indicator signal from the first sensor hose and for transmitting the indicator signal from the second sensor hose, a common detector is provided which communicates with the output of the second sensor hose.

And in the second case, the monitoring device is then particularly characterized in that a dedicated pump and a dedicated detector are provided for the first sensor hose, and in that, likewise, a dedicated pump and a dedicated detector are provided for the second sensor hose.

Both the sensor hoses are preferably respectively laid arranged in one plane or in the space in serpentine or meandering fashion.

With the foregoing and other objects in view there is also provided, in accordance with the invention, an improved sealing liner of the type provided in a monitoring assembly of a landfill, which sealing liner bounds a body of waste and seals the body of waste against an environment thereof; the improvement comprises: first means fitted on one side of the sealing liner for receiving and holding a portion of a first sensor hose and second means fitted on another side of the sealing liner for receiving and holding a portion of a second sensor hose substantially parallel to the portion of the first sensor hose.

In other words, the sealing liner for the monitoring device of a landfill distinguishes itself, according to the invention, by the fact that means are provided which hold the section of the first sensor hose parallel to the section of the second sensor hose.

With the above and other objects in view, there is also provided, in accordance with the invention, a method of localizing a leak in a sealing liner of a landfill, which comprises:

guiding a transport medium in regular time intervals through a first sensor hose laid on one side of a sealing liner of a landfill, and through a second sensor hose laid parallel to and opposite from the first sensor hose on the other side of the sealing liner, and causing detectable substances to be transported out of the first and second sensor hoses;

measuring the detectable substances transported out of the first and second sensor hoses by means of first and second indicator signals, respectively;

logically linking the first indicator signal with the second indicator signal according to location; and one of displaying and evaluating a combined signal obtained in the linking step.

In other words, a transport medium is led at regular time intervals through a first sensor hose, which is laid on one side of the sealing liner, and through a second sensor hose, which is laid parallel thereto on the other side of the sealing liner, in that the materials removed from the first and the second sensor hose are measured by means of indicator signals, in that the indicator signal from the first sensor hose is logically combined, as a function of a location of origin of the substance concentration represented by the signals, with the indicator signal from the second sensor hose, and in that the logically combined signal is displayed. The two indicator signals are preferably subtracted from each other, according to location, during the logical combination.

The basic principle of the present invention can be quite easily recognized in the following example: on both sides of the sealing liner, with the aid of sensor hoses arranged largely parallel to each other and permeable to pollutants, the LEOS technique is applied, that is to say the "sniffing technique" known per se. In this case, the difference of the concentration on both sides of the sealing liner is determined and shown as a function of the "hose position distribution" i.e. as a function of the flow path In this representation, a leak is distinctly marked as an extreme value, specifically irrespective, for example, of accumulated concentrations present above (in the case of horizontally arranged seals) the sealing liner as a result of previously accumulated dangerous waste, which has become entrapped, for example, in the concrete.

The advantages of the invention can be summarized as follows: the described device and the process do not require any vacuum-tight monitoring space. The method described is independent of locally fluctuating special waste concentrations above the sealing liner in the case of industrial areas; in the case of dump surface seals, it behaves in the opposite manner. Only a single-layer sealing liner is now necessary, which means considerable savings in comparison with the known double-sealing liner. The method measures the "barrier function of the sealing liner" directly when forming the concentration differential; in other words, the concentration difference at each measuring location is a measure of the quality of the sealing liner present there (possibly severely stressed there). In contrast to the known method using a double-sealing liner, no complex conduits are necessary either between the polyethylene liner and the LEOS hose; this is due to the fact that presently the total surface to be monitored does not have to be subdivided into segments which require mutual sealing.

Other features which are considered as characteristic for the invention are set forth in the appended claims.

Although the invention is illustrated and described herein as embodied in an assembly for monitoring a landfill or similar body of waste materials and a method of locating leaks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
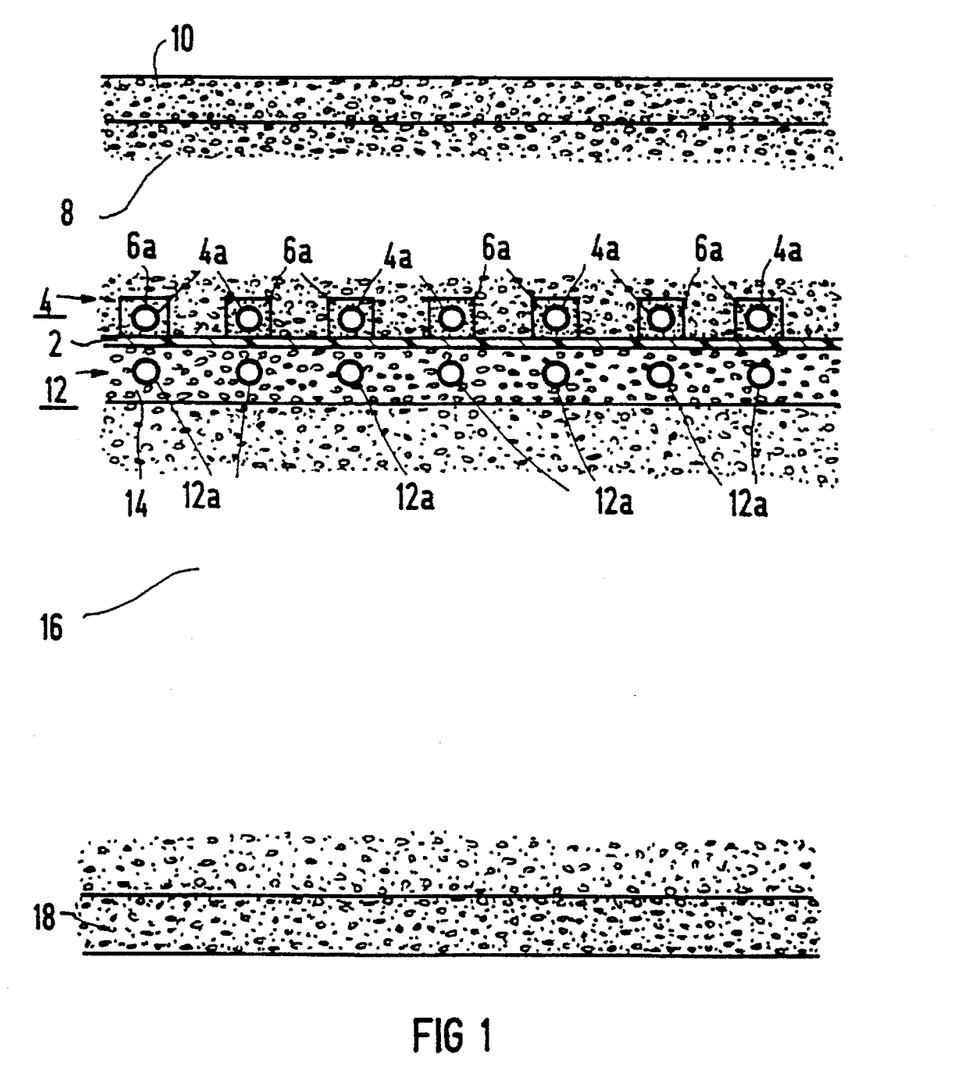
FIG. 1 is a cross section of a polyethylene sealing liner, with a prior art sensor hose disposed on both sides thereof, the sealing liner being disposed in a concrete construction.

Referring now to the figures of the drawing in detail and first, particularly, to FIG. 1 thereof, there is shown the mechanical part of a monitoring device which is provided for a landfill of garbage dump, particularly for a depository for hazardous industrial waste. The crucial element is a sealing liner 2 of synthetic material, which preferably comprises polyethylene and which is laid in a horizontal plane. A first permeable sensor hose 4 is laid in serpentine or meandering fashion on the upper side of the sealing liner 2. The individual portions of the first sensor hose 4 are designated by 4a. They are accommodated in horizontally arranged safety collection conduits or channels 6a running parallel to each other. These channels 6a are formed by a protective concrete layer 8 above which yet another layer 10 of vacuum concrete, which can be smoothed with sprinkled corundum, is applied. On the underside of the sealing liner 2 there is a second permeable sensor hose 12, which is likewise laid in serpentine fashion and whose individual portions are designated by 12a. The portions 12a of the second sensor hose 12 run in each case parallel to a portion 4a of the first sensor hose 4. Just like the first sensor hose 4, the second sensor hose 12 is also permeable to the pollutants which are to be monitored. Preferably, it also comprises polyethylene. The two sensor hoses 4, 12 are therefore the above-mentioned LEOS hoses. Their spacing from the sealing liner 2 is small, for example between 0.5 and 2 hose diameters.

In contrast to the first sensor hose 4, the second sensor hose 12 is not accommodated in protective collecting channels 6a, but in a fine gravel layer 14. The fine gravel layer 14 is supported on a foundation 16 made of concrete. The foundation 16 can in turn be sealed downwardly by means of a lean concrete layer 18.

Alternatively, the first and second hoses 4 and 12 can be laid in the same way either in concrete safety channels or in fine gravel.

Figure 2:
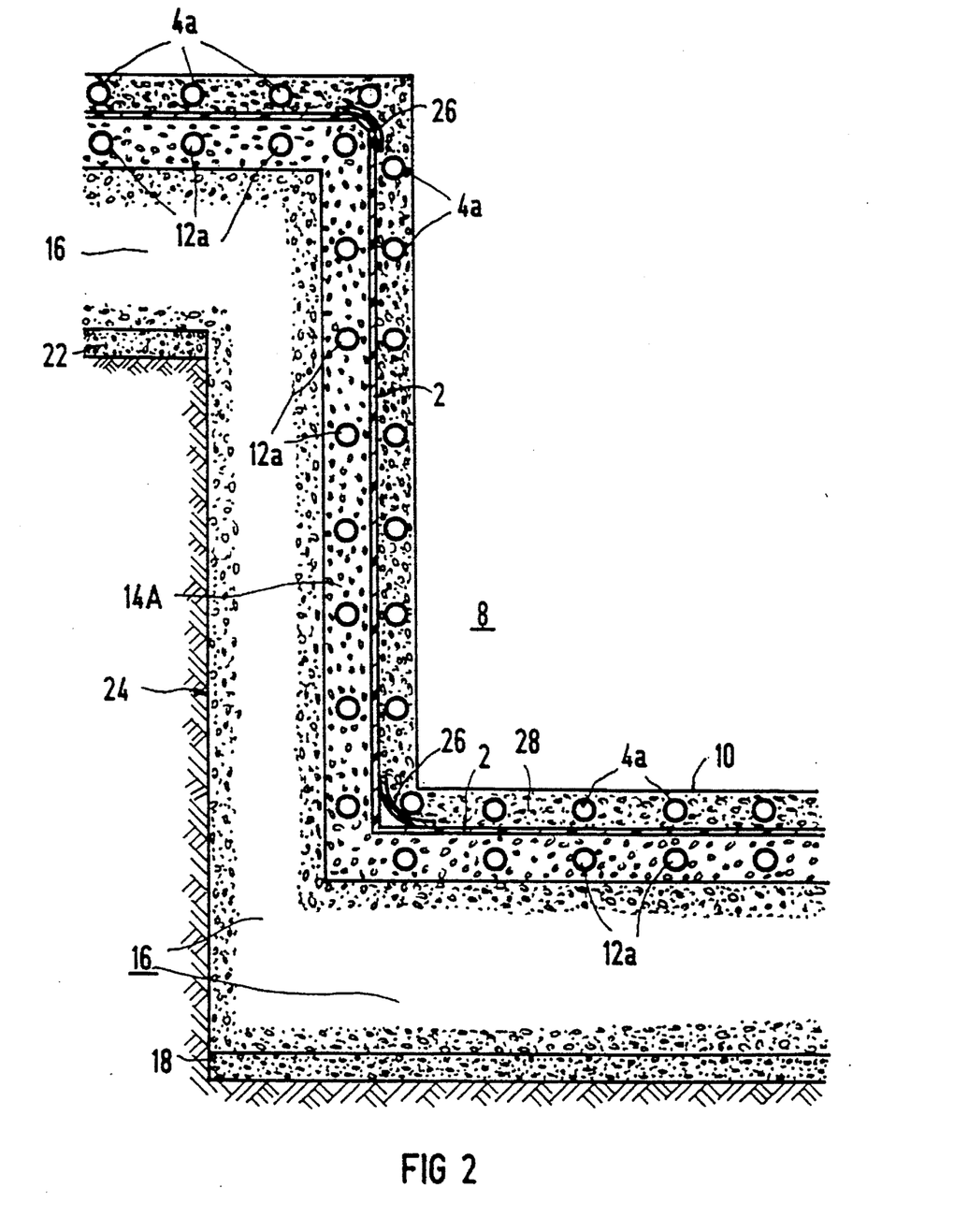
FIG. 2 is a section of such a sealing liner disposed throughout an entire trough of a dump.

FIG. 2 shows the left edge of a waste dump trough with vertical walls. The waste dump is formed in the ground 20. The bottom and the edge region are respectively covered with a lean concrete layer 18 and 22. On this there is a concrete foundation 16 which has a vertically rising wall 24 between the bottom region and the edge region. A protective layer 14A is applied on the foundation 16 and contains parallel portions 12a of the second sensor hose 12, either over its entire expanse or in a partial region thereof. On the protective layer 14A there is disposed, in turn, the sealing liner 2 made of synthetic material. It should be noted that the single-layer sealing liner 2 stretches continuously from the bottom region over the wall region as far as the edge region. Reinforcing members 26 are provided at the corners. A further protective layer 28 is disposed on the sealing liner 2 in which the parallel portions 4a of the first sensor hose 4 are accommodated. Again, the portions 4a run parallel and closely adjacent to the portions 12a. A concrete layer 8 is disposed on the protective layer 28, analogously to the view of FIG. 1.

Figure 3:
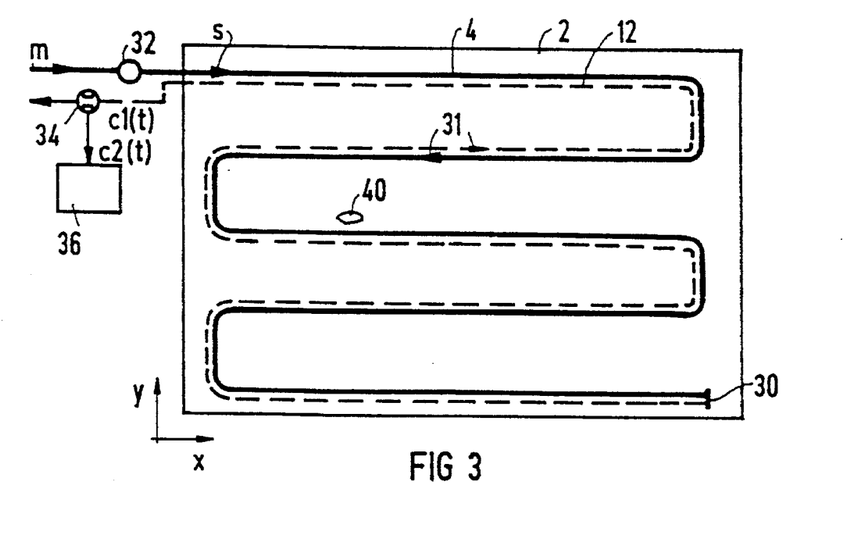
FIG. 3 is a diagrammatic top-plan view illustrating two sensor hoses flowed through by the transport medium in mutually opposite directions.

With reference to FIG. 3, which illustrates a complete monitoring device for a landfill in diagram, the first sensor hose 4 is disposed on the upper side of the sealing liner 2. The sensor hose is laid in serpentine (meandering) fashion. The second sensor hose 12 is laid directly below the sealing liner 2, likewise in serpentine fashion. The sensor hoses 4 and 12 are laid mutually parallel. In order to make this clear in the plan view shown, the second sensor hose 12 is illustrated in dashed lines slightly displaced from the first sensor hose 4. In this embodiment, the end (outlet) of the first sensor hose 4 merges into the inlet of the second sensor hose 12 via a short connecting member 30 running essentially vertically. Accordingly, the transport medium m flows through the two sensor hoses 4, 12 at intervals in time successively and in mutually opposite directions. This is indicated by the arrows 31. The flushing of the hoses is effect with a pump 32 at the inlet of the first sensor hose 4. Instead of the "pushing" pump at the inlet of the hose 4, it is also possible to provide a "suction" pump at the outlet of the second sensor hose 12. A sensor or detector 34 is disposed at the end of the sensor hose 12 which responds to one or more of the pollutants penetrating into the sensor hoses 4, 12.

The detector transmits a first indicator signal c1 which is a measure of the concentration c as a function of the time t of a pollutant flushed out of the first sensor hose 4 by means of the transport medium m. In addition, the detector 34 transmits a second indicator signal c2 which is a measure of the concentration c as a function of the time t of the pollutant washed out of the second sensor hose 12 by means of the transport medium m. In the present embodiment, the second indicator signal c2(t) is transmitted first (the pollutants from the sensor hose 12 reach the sensor first), and then the first indicator signal c1(t).

These two indicator signals c1(t) and c2(t) are fed to a computer 36, where one signal is first stored. With the aid of the flow velocity (measured in a known way) of the transport medium m, the curve of the concentration c with respect to location along the flow path s (through 4 and 12) is calculated in the computer 36. The resulting indicator signals c1(s) and c2(s) are therefore a function of the location in the flow path. These two indicator signals are logically combined with one another, according to location, in the computer 36, preferably subtracted from each other, and displayed, as will become clear later. An evaluation with regard to possible leaks (extreme concentration maxima) can also be carried out at this point.

Since only a single sealing liner 2 is necessary for sealing the dump in the present case, it is relatively simple to localize a leak 40 in the sealing liner 2 with two sensor hoses 4, 12 arranged in parallel.

Figure 4:
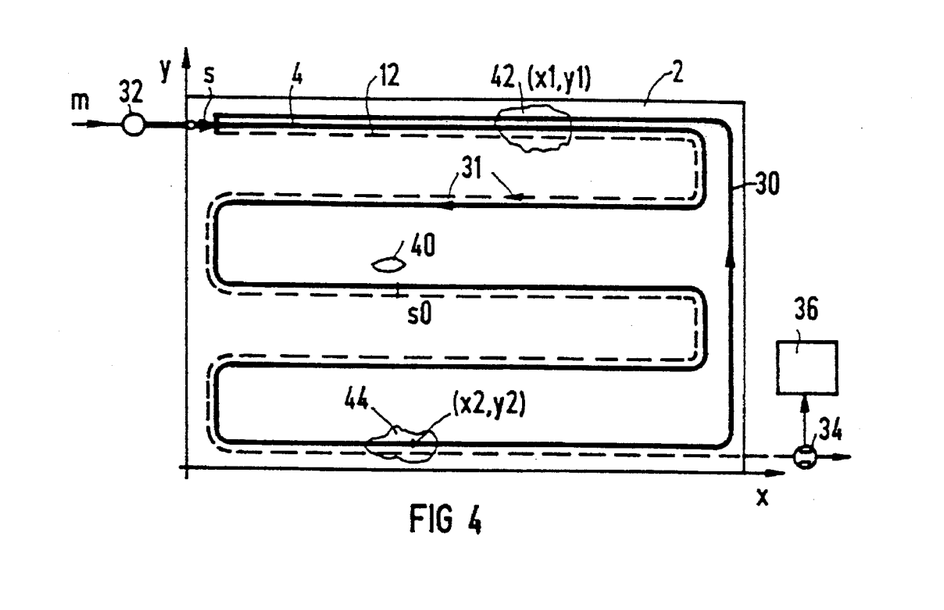
FIG. 4 is a similar view of a configuration in which the transport medium flows through the hoses in the same direction.

In the embodiment according to FIG. 3, only a relatively short connection 30 was used to connect the two sensor hoses 4, 12 to each other through the sealing liner 2. The result is that the transport medium m flows through the two sensor hoses 4, 12 in mutually opposite directions. With reference to FIG. 4, it is possible, by means of a longer connecting member 30, to effectively switch the inlet and outlet sides of the second sensor hose 12. Accordingly, the transport medium flushes the two sensor hoses 4, 12 in the same direction, as illustrated with the small arrows 31. In principle, the monitoring device according to FIG. 4 otherwise shows the same construction as that of FIG. 3. In both cases, the sealing liner 2 can be disposed, instead of horizontally, also vertically or obliquely in space.

The long connection 30 of FIG. 4 is not as a sensor hose, but as a non-permeable hose. It can, therefore, also be arranged largely outside the sealing liner 2.

Figure 5:
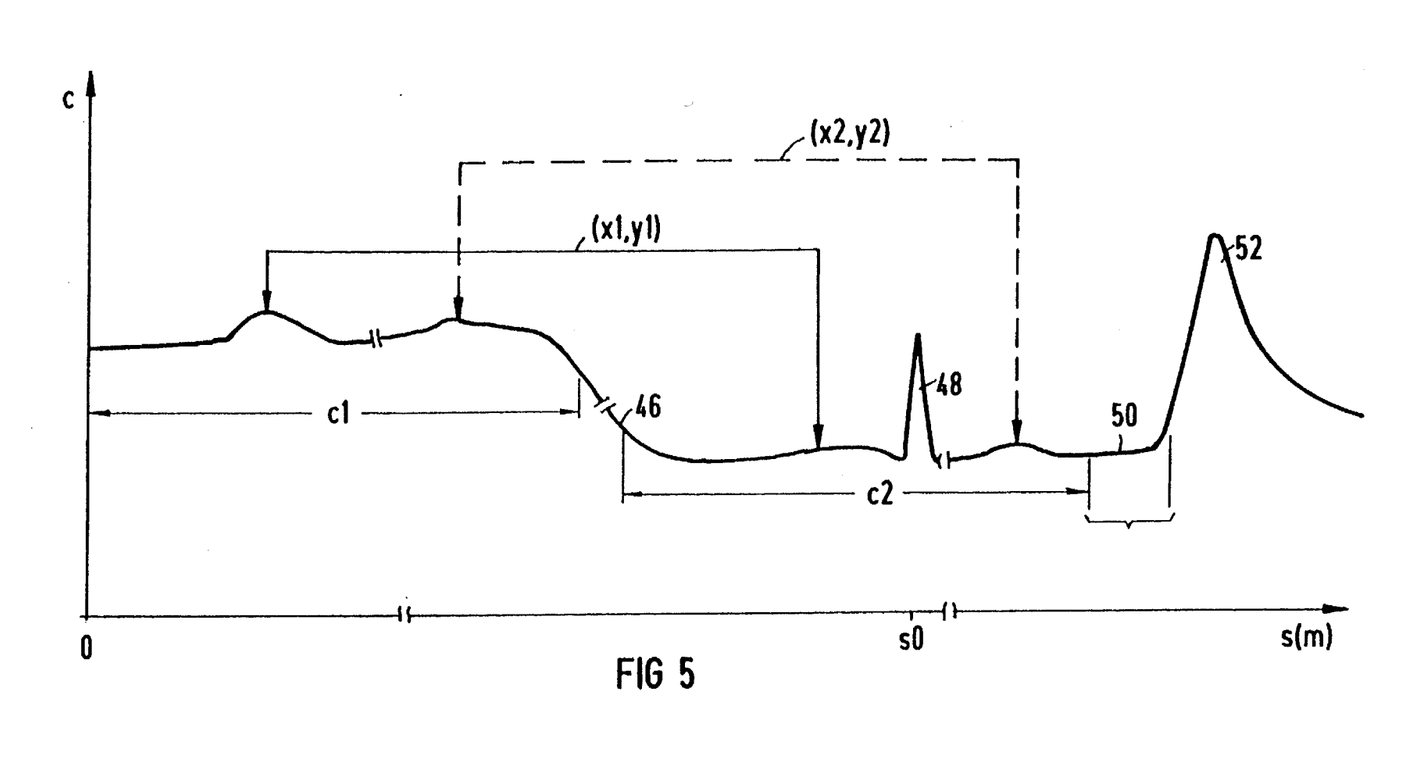
FIG. 5 is a graph illustrating concentration as a function of the location, as determined by a detector and a computer in a monitoring device according to FIG. 4.

Referring now to FIG. 5, which pertains to the embodiment of FIG. 4, a typical signal diagram is explained as follows: We assume, for this case, that not only a leak 40 is present, but that there is also a first location 42 of high concentration of pollutants at a location (x1, y1)=s1 and a second location 44, likewise of high concentration of pollutants, at a location (x2, y2)=s2. Both locations 42, 44 lie above the sealing liner 2.

In the signal diagram of FIG. 5, the concentration c determined by the computer 36 with the aid of the flow velocity is shown as a function of the flow path s, which is measured in meters. At the location s=0, the first indicator signal c1 begins, which stems from the preliminary conduit or from the first sensor hose 4. At the locations of increased concentration, as a result of the concentration spots 42, 44, small maxima in the curve can be recognized. These are followed by a transition curve 46, which is caused by the flushing of the connection 30. Subsequently, as second indicator signal c2, the concentration curve is recognizable, which comes about because of the return conduit or the second sensor hose 12. In this curve, locations (x1, y1) and (x2, y2) do have small maxima, as well, at the locations of higher concentration. In between them, an elevated extreme value 48 is distinctly recognizable, which characterizes the leak 40. The maximum 48 is at the location s0, which is to be determined by means of the monitoring device. After a further transition path 50, an end maximum 52 follows the curve c2(s). This is caused by the apparatus.

Figure 6:
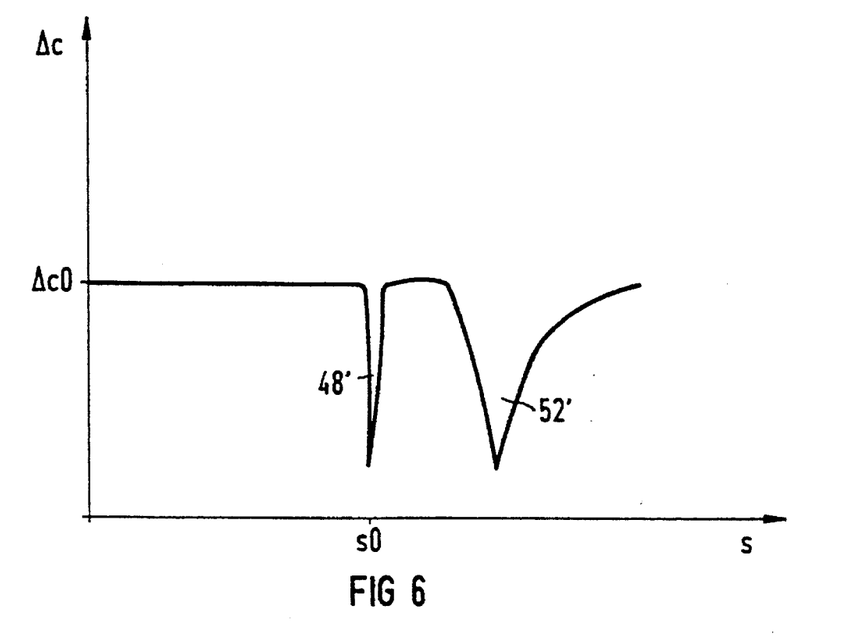
FIG. 6 is a curve showing a positive difference signal determined therefrom.
Figure 7:
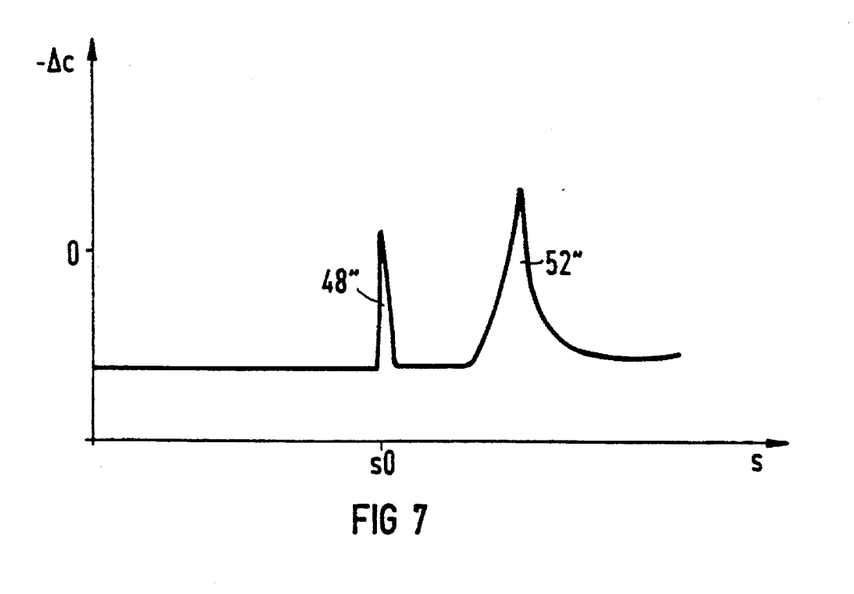
FIG. 7 is a curve showing an alternatively determined negative difference signal.

It is therefore clear from FIG. 5 that a double concentration value c is assigned to each point s of the sealing liner 2 along the double conduit 4, 12. If the concentration values c1 and c2 are now subtracted from each other point for point along the flow path s, then either the curve of the difference signal Δc with respect to location shown in FIG. 6 or in FIG. 7 is obtained—respectively according to choice of sign. In each of the two curves, the identified leak 48' or 48" at the location s0 is distinctly recognizable.

Figure 8:
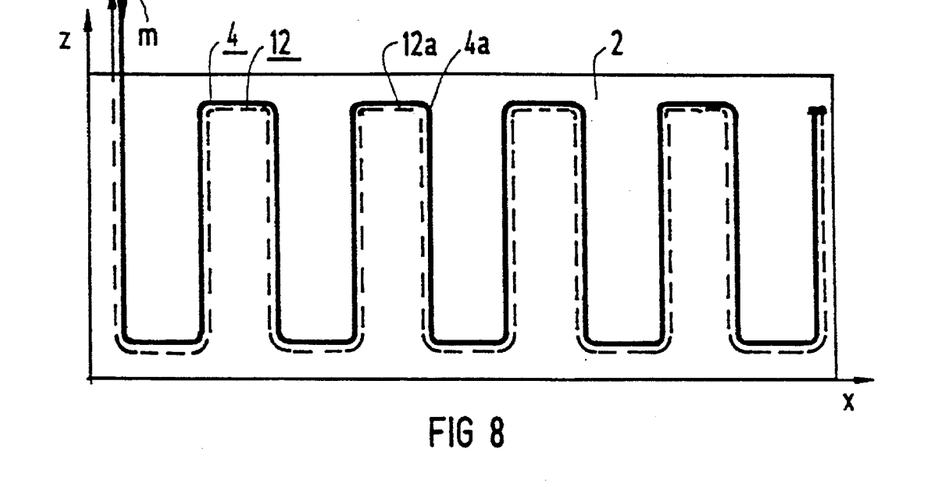
FIG. 8 is a diagrammatic elevational view with a substantially vertical sealing liner and meandering sensor hoses.

The initial assumption in FIGS. 3 and 4 was that the horizontal bottom region of a landfill, characterized by means of coordinates x, y, is provided with a sealing liner 2 and monitored for leaks 40. With reference to FIG. 8 it is now shown that this can also be carried out on a sloping or upright wall. Here, too, two sensor hoses 4, 12 are laid parallel to each other and in serpentine fashion on both sides of the sealing liner 2. The sealing liner 2 in this case—in contrast to FIGS. 6 and 7—covers a coordinate grid or coordinate plan x, z. Here the portions 4a, 12a, i.e. the long conduit portions of the serpentine path, of the sensor hoses 4 and 12 run vertically or obliquely in space.

Figure 9:
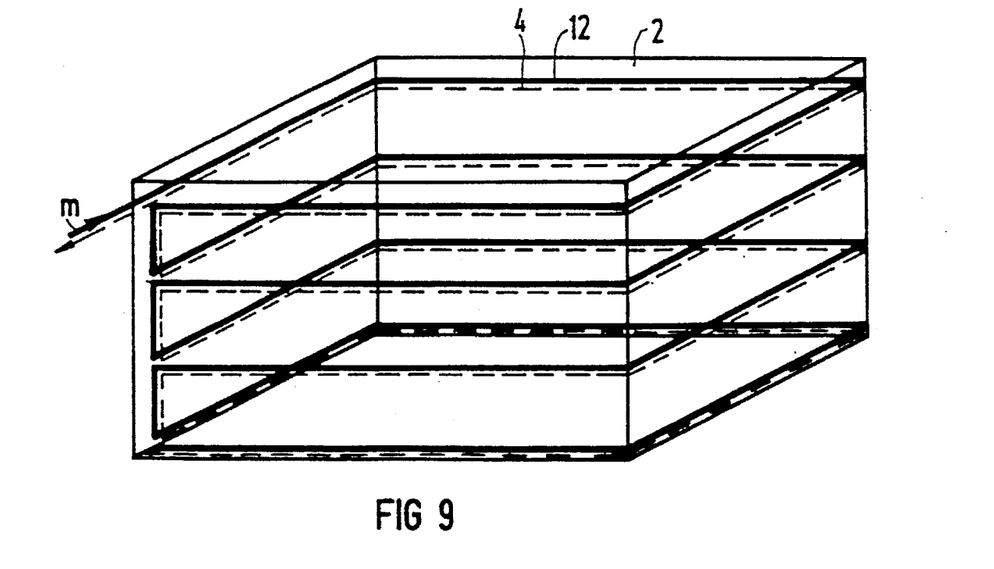
FIG. 9 is a diagrammatic, perspective view illustrating a spatially serpentine configuration of the sensor hoses.

In FIG. 9, a box-shaped landfill is presupposed, which comprises a bottom region and four upright walls arranged at right angles. Here, the two sensor hoses 4, 12 are laid on both sides of the respective wall sealing liner 2 in serpentine fashion in space. In the embodiment shown, use is again made of the counterflow principle. The same flow direction can also be selected instead.

Figure 10:
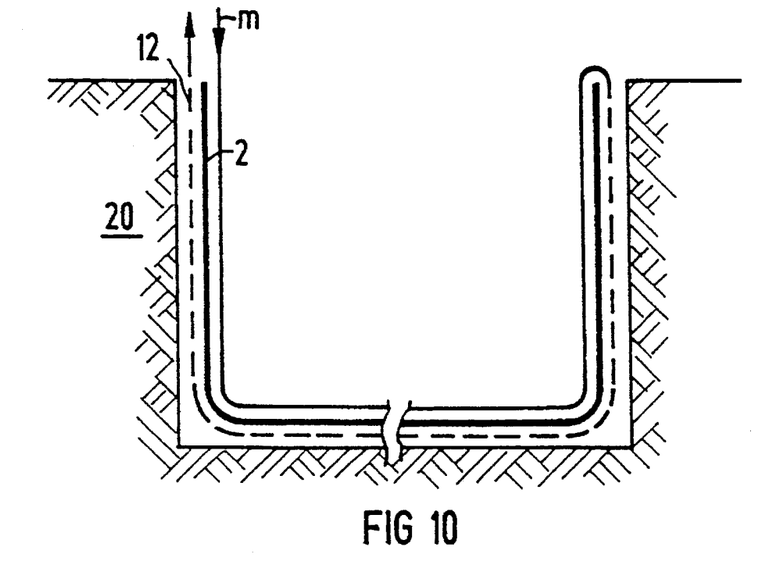
FIG. 10 is a section through a landfill with the bottom and the sides thereof lined with of a continuous sealing liner.

A trough-shaped landfill is shown once again in principle in FIG. 10. The body of the waste in the center is not shown. It is shown here that the first sensor hose 4 and the second sensor hose 12 can be laid on a combination of horizontally and vertically arranged walls. In this case also, an arbitrary layout (yet defined) in serpentine fashion can be chosen.

Figure 11:
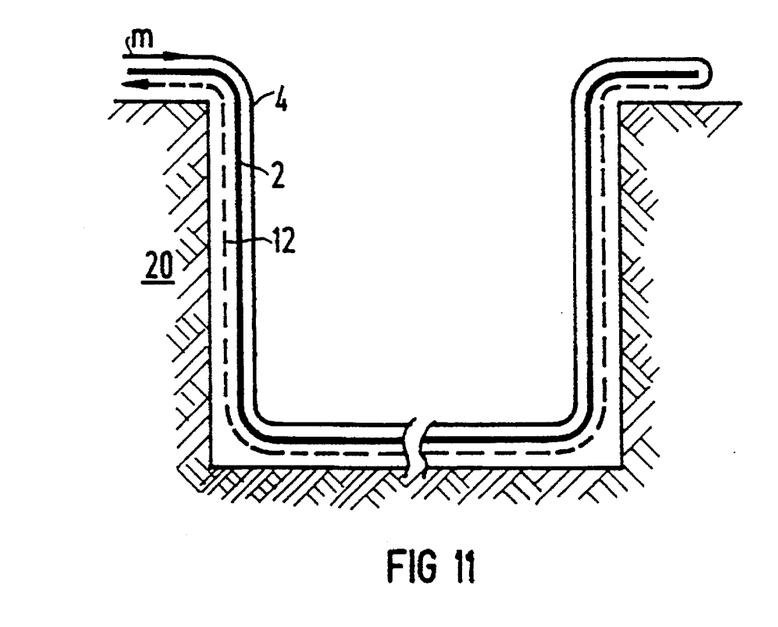
FIG. 11 is a similar view showing a landfill with the bottom, sides and edges thereof lined with a continuous sealing liner.

In the exemplary embodiment according to FIG. 11, this principle is extended to the edge region of the trough-shaped landfill. Therefore, the upper edge region is also included here in the layout. And here, too, an arbitrary layout in serpentine fashion can again be chosen.

It should again be emphasized that the two sensor hoses 4, 12, in the case of flow in the same or in the opposite direction, do not necessarily need to be connected one after the other, as has previously been shown in the figures.

Figure 13:
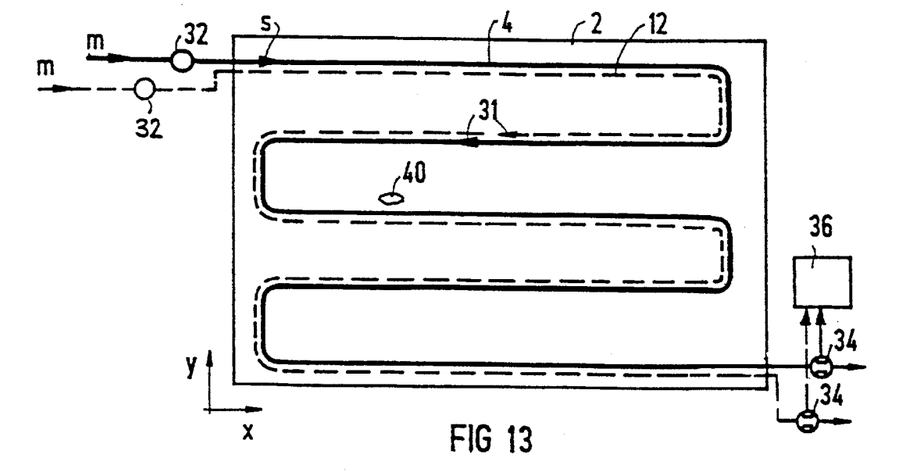
FIG. 13 is a view similar to that of FIGS. 3 and 4, showing dedicated pumps and sensors for each of the sensor hoses.

With reference to FIG. 13, it is also possible to use a dedicated pump and a dedicated detector for the first sensor hose which provides the first indicator signal c1. Likewise, a dedicated pump and a dedicated detector which transmits the second sensor signal c2 are provided for the second sensor hose 12. The logical combination of the two indicator signals c1, c2 according to location is then carried out in the way described.

Figure 12:
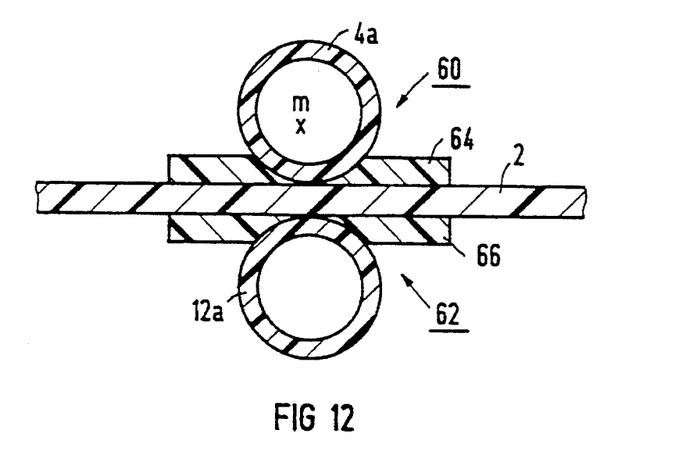
FIG. 12 is a cross-section through a parallel holding device for the hose sections disposed above and below the sealing liner.

It has already been mentioned several times that the portion 4a of the first sensor hose 4 fitted on one side of the liner is held parallel to the portion 12a of the sensor hose 12 fitted on the opposite side of the liner. For this purpose, special means are necessary. Such means 60 and 62 are shown by way of example in FIG. 12. The means 60, 62 for holding the portions 4a, 12a parallel can be integrated into the sealing liner 2, for example in the form of knubs, nipples or flanges. Instead, they can also be fastened to it, for example welded to it or preferably adhesively bonded to it.

They can in particular be in the form of a clamping device. According to FIG. 12, guide members 64, 66 made of synthetic material, matched to the hoses 4, 12 and rounded on one side, are bonded to the sealing liner 2 on both sides thereof. The hose portions 4a, 12a lie parallel to each other in the recesses.

We claim:

1. A monitoring assembly for a landfill, comprising:

a sealing liner having a first side and a second side;

a first sensor hose laid on said first side of said sealing liner;

a second sensor hose laid on said second side of said sealing liner, at least a portion of said second sensor hose running parallel to a portion of said first sensor hose;

pump means for charging said first and second sensor hoses with a transport medium;

detector means for issuing a first indicator signal indicating a substance in the transport medium fed through said first sensor hose and for issuing a second indicator signal indicating a substance in the transport medium fed through said second sensor hose; and logic means for logically linking, with respect to location, said first indicator signal from said first sensor hose with said second indicator signal from said second sensor hose.

2. The monitoring assembly according to claim 1, wherein each of said first and second sensor hoses has an input and an output, and the assembly further comprises a connection member communicatingly connected between said output of said first sensor hose and said input of said second sensor hose, and said detector means is a common detector communicating with said output of said second sensor hose, said common detector issuing the first indicator signal from said first sensor hose and the second indicator signal from said second sensor hose.

3. The monitoring assembly according to claim 1, wherein said pump means comprise a first dedicated pump communicating with said first sensor hose and a second dedicted pump communicating with said second sensor hose, and said detector means comprise a first dedicated detector for said first sensor hose and a second dedicated sensor for said second sensor hose.

4. The monitoring assembly according to claim 1, wherein said logic means include a subtraction element for logically linking the first and second indicator signals according to a location of the substance in said sensor hoses.

5. The monitoring assembly according to claim 1, wherein said logic means include a computer for logically linking the first and second indicator signals according to location of the substance in said sensor hoses.

6. The monitoring assembly according to claim 1, wherein said first and second sensor hoses are laid two-dimensionally or spatially in a meandering fashion and parallel to one another.

7. The monitoring assembly according to claim 1, wherein the at least one portion of said second sensor hose and the portion of said first sensor hose are disposed such that the transport medium flows therethrough in the same direction.

8. The monitoring assembly according to claim 1, wherein the at least one portion of said second sensor hose and the portion of said first sensor hose are disposed such that the transport medium flows therethrough in mutually opposite directions.

9. The monitoring assembly according to claim 1, wherein said sealing liner is disposed in one of a substantially horizontal orientation, a steeply rising orientation, and a vertical orientation.

10. The monitoring assembly according to claim 1, wherein said sealing liner is formed of a synthetic material.

11. The monitoring assembly according to claim 1, wherein said detector means include means for issuing the first and second indicator signals as representing a concentration of the substance in the transport medium as a function of a flow path length.

12. The monitoring assembly according to claims 1, wherein at least one of said first and second sensor hoses is disposed in concrete.

13. The monitoring assembly according to claim 1, wherein said sealing liner bounds a body of waste and seals the body of waste against an environment thereof, and includes first holding means fitted on one of said sides of said sealing liner for receiving and holding said portion of said first sensor hose, and second holding means fitted on the other of said sides of said sealing liner for receiving and holding said portion of said second sensor hose substantially parallel to said portion of said first sensor hose.

14. The monitoring assembly according to claim 13, wherein said first and second holding means are integrally formed in said sealing liner.

15. The monitoring assembly according to claim 13, wherein said first and second holding means are adhesively fastened to said sealing liner.

16. The monitoring assembly according to claim 13, wherein said first and second holding means comprise a clamping device for clamping at least one of said portions of said first and second sensor hose therein.

17. The monitoring assembly according to claim 13, wherein said first and second sensor hoses are received in said first and second holding means such that they are laid in a meandering fashion.

18. The monitoring assembly according to claim 13, wherein said sealing liner includes walls defining a trough having a bottom and side walls.

19. The monitoring assembly according to claim 18, wherein said first and second holding means for receiving and holding the respective portions of said sensor hoses are disposed at at least one of the bottom, one of the side walls, and an upper edge region of said trough.

* * * * *